J. C. EICKHOFF.
CURD CUTTING MACHINE.
APPLICATION FILED DEC. 6, 1909.

979,835.

Patented Dec. 27, 1910.
2 SHEETS—SHEET 1.

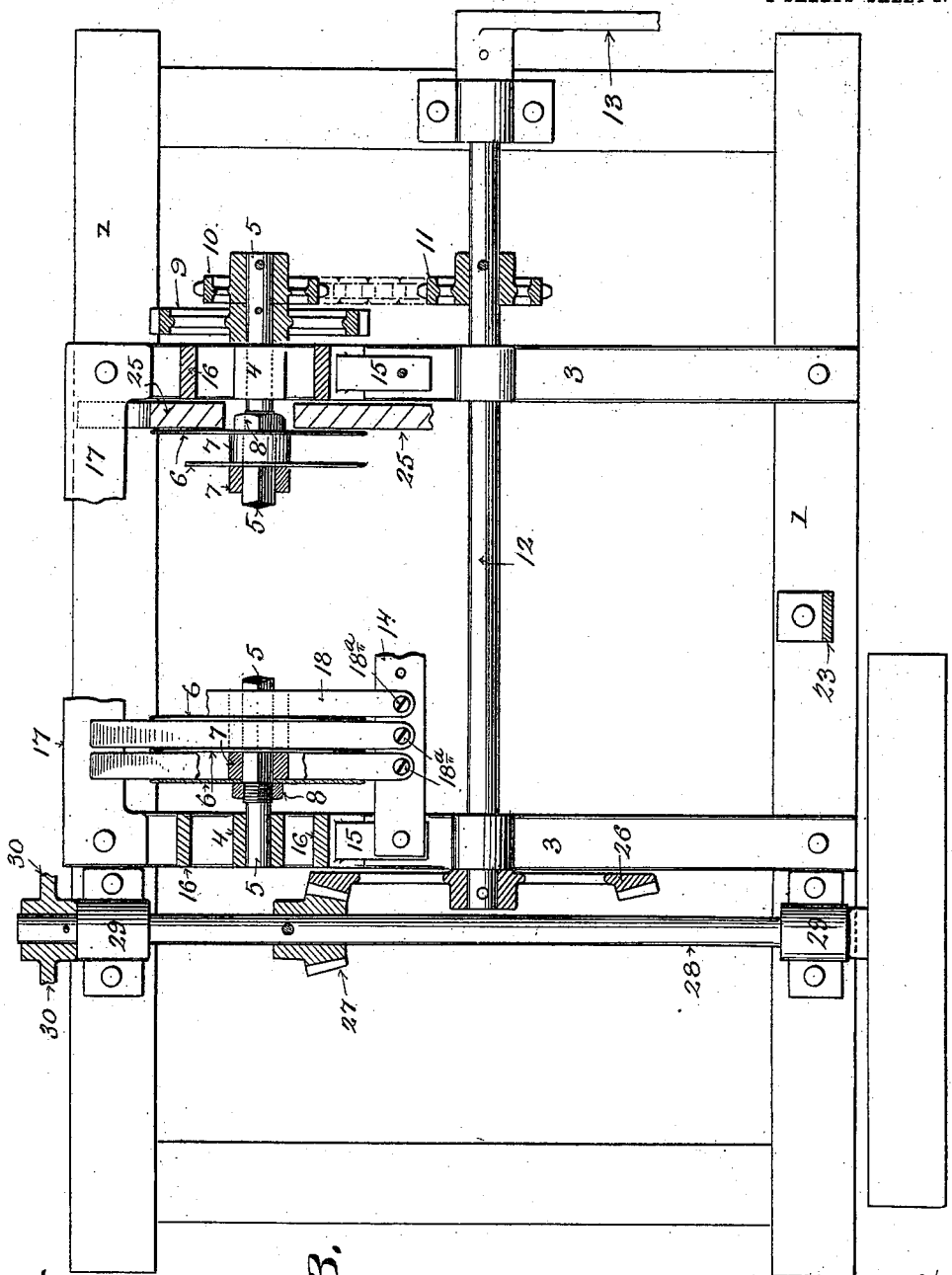

UNITED STATES PATENT OFFICE.

JOHN C. EICKHOFF, OF BLACKCREEK, WISCONSIN.

CURD-CUTTING MACHINE.

979,835.  Specification of Letters Patent.  Patented Dec. 27, 1910.

Application filed December 6, 1909. Serial No. 531,535.

*To all whom it may concern:*

Be it known that I, JOHN C. EICKHOFF, a citizen of the United States, and resident of Blackcreek, in the county of Outagamie and State of Wisconsin, have invented certain new and useful Improvements in Curd-Cutting Machines; and I do hereby declare that the following is a full, clear, and exact description thereof.

The object of my invention is to provide a simple, economical and efficient curd-cutting machine, the invention consisting in certain peculiarities of construction and combination of parts as hereinafter set forth with reference to the accompanying drawings and subsequently claimed.

Figure 1:
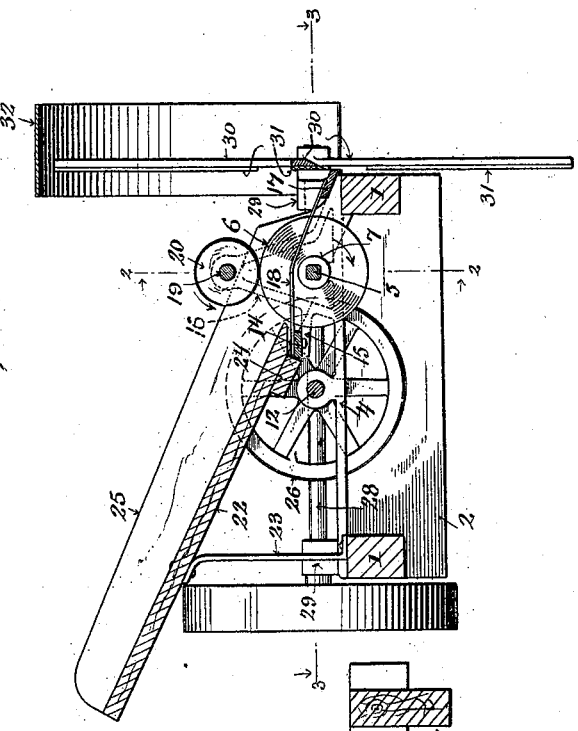
Figure 2:
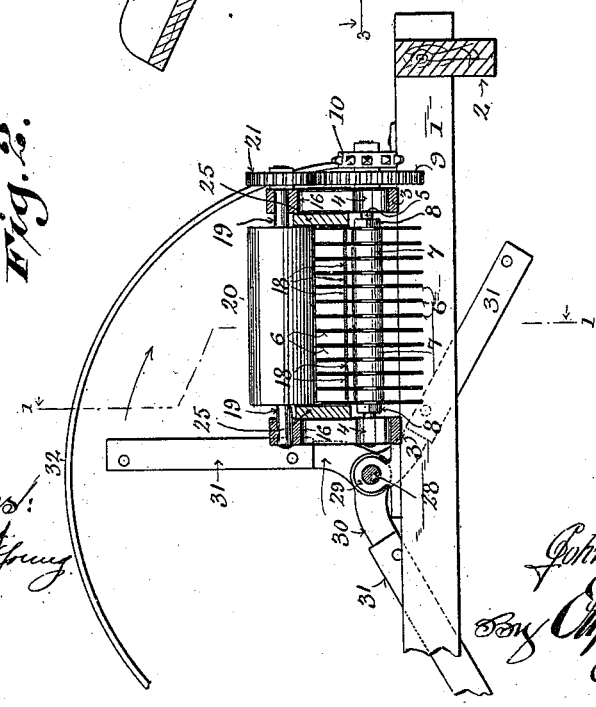

In the drawings Figure 1, represents a longitudinal sectional view of a machine embodying the features of my invention, the section being indicated by line 1—1 of Fig. 2; Fig. 2, a transverse sectional view of the same with parts broken away, the section being indicated by line 2—2 of Fig. 1, and Fig. 3, a plan sectional view of the machine upon an enlarged scale, with parts broken away to more clearly indicate structural features, the section being indicated by line 3—3 of Fig. 1.

Referring by numerals to the drawings 1, 1, represent the transverse timbers of a frame, and 2, 2, the longitudinal timbers of said frame. Secured to the transverse timbers are parallel brackets 3 provided with bearings 4 for a shaft 5. The major length of this shaft is preferably squared for the reception of a series of disks 6 having squared central apertures through which the shaft extends. The disks are spaced equal distances apart by means of thimbles 7, which thimbles are mounted upon the shaft between the disks as best shown in Fig. 3. The end disks of the series are held in position upon the shaft by means of jam-nuts 8 that are in screw-threaded connection with threaded sections which project from the terminal points of the squared section of said shaft. One end of the disk shaft extends through its bearing 4 and has secured thereto a gear-wheel 9 and a sprocket-wheel 10, the sprocket-wheel being in link-belt connection with a similar sprocket-wheel 11 that is carried by a power-shaft 12. This power-shaft is also mounted in bearings that extend from the brackets 4 and a supplemental bearing or box which is secured to one of the longitudinal frame timbers. The power-shaft is, in this instance, driven by a hand-crank 13 that is secured to its end but, in some instances, a belt pulley may be substituted therefor.

A bar 14 that extends parallel with and rearward of the disk shaft is secured to ears 15 that extend from one pair of arms of a skeleton-hanger 16, which hanger forms part of the bracket 4. A shear-plate 17 extends across the front of the series of disks and is secured by suitable bolts to the brackets 4 and adjacent timber of the frame. A series of flat spring metal strips 18 are pivotally secured to the bar 14 by means of bolts $18^a$, the spring strips being extended beyond and interposed between the disks, over the shaft 5, and arranged to extend forwardly with their free ends resting upon the shear-plate 17. These spring strips thus form a yielding throat upon which the curd is adapted to pass when the same is being fed through the machine. The hangers 16 terminate at their upper ends with bearings for the trunnions 19 of a feed-roller 20, which roller is adapted to engage the cutting edges of the disks, it being positively driven by a gear-wheel 21 fast upon one of its trunnions and in meshing engagement with the gear-wheel 9 carried by the disk shaft, the proportions of these gears being relatively such that the peripheral speed of the feed-roller and cutting edges of the disks are the same. An upwardly inclined trough 22 is arranged to extend from the rear edges of the disk series, the trough being supported by a brace 23, which brace rises from one of the timbers of the frame. The bottom of the trough terminates just above the carrying bar 14 of the strips 18, there being a cross-brace 24 secured to the bottom and adapted to abut said bar. The trough is provided with side-bars 25, which side-bars embrace the outer faces of the end disks of the series and terminate with extensions that rest upon that transverse timber 1 of the frame which is located directly under the shear-plate.

The inner end of the power-shaft 12 is provided with a beveled-toothed gear-wheel 26 that is meshed with a beveled-pinion 27, which beveled-pinion is carried by a shaft 28 that is disposed parallel to the adjacent bracket 3. The shaft 28 has its bearings in front and rear boxes 29 that are secured to the transverse timbers of the frame, there being a balance or fly-wheel secured to one end of said shaft. The front end of this shaft has secured thereto a head having radially disposed arms 30, to which arms are secured blades 31 that are arranged to have shearing engagement with the shear-plate 17, there being a suitable semi-circular shield 32 surrounding the upper portion of the head, which shield serves as a protecting guard for the same.

From the foregoing description it will be seen that motion from the power shaft will be imparted through its bevel-gear connection to shaft 28 and knife-head, motion from the power-shaft being also transmitted to the curd feed mechanism (comprising the series of disks and upper feed-roller) through its chain-belt connection with the disk shaft. Hence the feed-roller being rotated in the direction as indicated by the arrow, the curd will be drawn into the throat, formed by said feed-roller spring strips 18, and forced therethrough. The above action is also due to the movement of the disks in the direction as indicated by the arrow and thus curd, while being forced through the throat, is also split into a series of strips which are discharged upon the shear-plate 17, and at this point cut into small cubes by the rapidly rotated knife-blades. Owing to the spring-strips 18 being pivoted rearwardly and being free at their forward ends, a close adjustment or fit between the edges of the strips and disks may be attained without liability of any undue grind or friction between the parts, for the reason that said spring strips are thus permitted slight lateral play in order to compensate for any unevenness between surfaces. The disks will thus be free to turn and with each revolution they are scraped clear of any curd which may adhere to their faces, the curd being all discharged at the point where it is sheared by the knives.

I claim:

1. In a curd-cutting machine having a shaft, a series of space cutting disks carried thereby, a feed trough extending rearwardly of the disks, and a shear-plate disposed forwardly of the disks; the combination of a series of flat independent strips permanently secured adjacent to the mouth of the trough and adapted to rest loosely upon the shear-plate, the strips being arranged to extend over the shaft to constitute a yieldable feed throat, a trunnioned feed roller disposed above said disks having engagement with their cutting edges, supporting brackets having bearings for the aforesaid disk shaft and feed roller trunnions, a rotatory knife arranged to have shearing engagement with the shear-plate, and driving gears for the knife, disk shaft and feed roller.

2. A curd-cutting machine comprising a shaft, a series of disks carried by the shaft, spacing rings mounted upon said shaft intermediate of the disks, an inclined feed trough extending rearwardly of said disks, a shear-plate disposed forwardly of the aforesaid disk, a series of independent flat spring strips connecting the trough and arranged to bear loosely upon the shear-plate intermediate of the disks to constitute a yieldable feed throat, a trunnioned feed roller having frictional engagement with the upper cutting edges of the disks, supporting brackets having bearings for the feed-roller and disk shaft, and gear connection between said disk shaft and one of the feed-roller trunnions, a rotatory knife arranged to have shearing engagement with the shear-plate and driving means connecting the knife and gear connection of the aforesaid disk shaft and feed-roller.

3. A curd-cutting machine comprising a frame, brackets secured to the frame, a shaft supported in brackets extending from the frame, a series of disks carried by the shaft, spacing thimbles interposed between the disks, a bar secured to the brackets rearwardly of the disks, a shear-plate carried by the frame forwardly of said disks, independent strips in pivotal connection with the bar, the strips being provided with free ends adapted to rest upon the shear-plate and arranged to extend between each pair of disks, a trunnion feed-roller revoluble in bearings that extend from the brackets, a gear-wheel carried by one of the feed-roller trunnions, another gear-wheel carried by the disk shaft for engagement with the feed-roller gear-wheel, a sprocket secured to said disk shaft, a power-shaft mounted upon the frame in parallel relation with the aforesaid disk shaft, a sprocket-wheel secured to the power-shaft, the sprocket-wheel being in chain-belt connection with the sprocket-wheel of the disk shaft, a shaft disposed at right angles to the power shaft having its bearings supported by the frame, a bevel-gear connection between this latter shaft and the power-shaft, a knife head having radial arms secured to that shaft which is at right angles to the power-shaft, blades secured to the arms of the knife-head, the blades being adapted to have a shearing engagement with the shear-plate, and an inclined trough supported by the frame and extending rearwardly of the series of disks, the trough being provided with side-bars which are abutted against the outer faces of the end disks of the series.

In testimony that I claim the foregoing I have hereunto set my hand at Blackcreek in the county of Outagamie and State of Wisconsin in the presence of two witnesses.

JOHN C. EICKHOFF.

Witnesses:
JOHN HOERNING,
WELLA GRIESE.